United States Patent [19]

Scheuneman et al.

[11] Patent Number: 4,926,426
[45] Date of Patent: May 15, 1990

[54] ERROR CORRECTION CHECK DURING WRITE CYCLES

[75] Inventors: James H. Scheuneman, St. Paul; Michael E. Mayer, Fridley; David M. Purdham, Brooklyn Park, all of Minn.

[73] Assignee: Unisys Corporation, Blue Bell, Pa.

[21] Appl. No.: 238,085

[22] Filed: Aug. 30, 1988

[51] Int. Cl.$^5$ .......................................... G06F 11/00
[52] U.S. Cl. .................................... 371/40.1; 371/40.2
[58] Field of Search ................ 371/40.1, 40.2, 3, 40.3, 371/40.4; 365/200, 201

[56] References Cited

U.S. PATENT DOCUMENTS

| | | | |
|---|---|---|---|
| 4,223,382 | 9/1980 | Thorsrud | 364/200 |
| 4,506,365 | 3/1985 | Collins | 371/40.1 |
| 4,531,213 | 7/1985 | Scheuneman | 371/3 |
| 4,706,248 | 11/1987 | Masaki | 371/3 |
| 4,780,809 | 10/1988 | Woffinden | 371/40.1 |

*Primary Examiner*—Michael R. Fleming
*Attorney, Agent, or Firm*—Glenn W. Bowen; Robert S. Bramson

[57] ABSTRACT

An error correcting check of a memory system is provided when a memory in which the Dynamic Random Access Memory (DRAM) is of the type which has input lines that are directly coupled to its output lines. Utilizing this type of DRAM, the memory system employs controls, input, output and read circuitry to read bits out of the memory via the output circuitry and write circuitry to write bits into the memory via the input circuitry. An error checking and correction circuit is coupled to the output means which includes a check bit generator and a syndrome generator, and a control means energizes the error checking and correcting means during the write cycle, as well as the read cycle, so that the errors are detected during the write cycle as well as the read cycle. In this manner, errors which occur in circuitry other than the memory, which includes the memory driving and reading logic and also the check bit generator logic translators and syndrome generators, may be separately detected from memory errors.

2 Claims, 1 Drawing Sheet

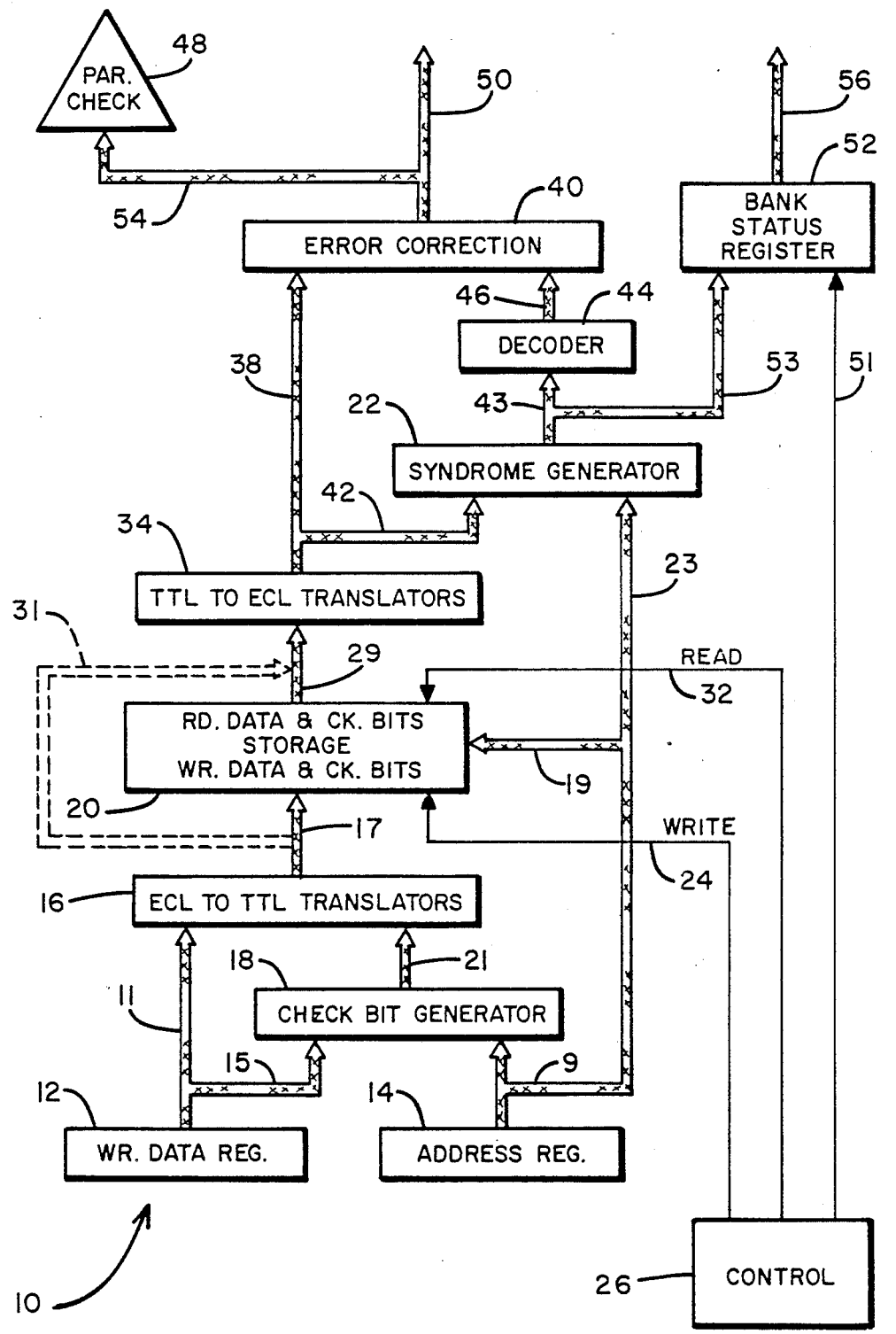

ERROR CORRECTION CHECK DURING WRITE CYCLES

BACKGROUND OF THE INVENTION

1. Field of the Invention

This invention relates to error checking and correction systems for memories for data processing systems. More particularly, it relates to an improvement in memory error checking systems in which errors which occur in the memory driving and reading logic, including the check bit generator, logic translators and the syndrome generator, might be separated from errors which occur in the memory.

2. Description of the Prior Art

Memory systems of various types have been developed through the years for use with data processing systems. Common to all memory systems utilized in binary data processing systems is the ability to record and read back some form or manifestation that can be distinguished between two possible states, one state indicating a binary zero and the other state indicating a binary one. These memory systems include memories that store data serially, such as on magnetic tapes, and memories that store data at addressable locations. The latter type of memories are often referred to as "random access" systems indicating that the data is capable of being specifically identified and retrieved through addressing. Addressable memories can include various types of structures that are well known. These include magnetic drums, magnetic disks, magnetic core memories, integrated circuit memories, as well as other more esoteric memory types.

More recently Dynamic Random Access Memory (DRAM) and Complementary-Metal-Oxide Semiconductor (CMOS) memories that require periodic refreshing of the memory contents have been employed for high speed memory access.

It has long been recognized that the integrity of the data bits that are stored and retrieved is critical to the accuracy of operations performed in the data processing system. The alteration of one bit in a data word can dramatically affect arithmetic calculations, or change the meaning of the recorded data. It was recognized that by associating an additional bit, called a "parity bit," with the binary bits comprising an addressable word, that erroneous data words could be detected.

Parity is, therefore, well known and simply involves summing, without the carry, the "1" bits in a data word and providing an additional parity bit that renders the total count across the data word, including the parity bit either odd or even. It is apparent that with a single parity bit in conjunction with a data word comprised of multiple number of bits, for example 36bits, multiple errors will defeat the parity system. As calculation rates increase, circuit sizes decrease and signal levels correspondingly are reduced. The likelihood of undetectable errors occurring is appreciably increased.

It has long been recognized in data transmission systems that by properly encoding data bits, multiple errors can be detected and corrected after transmission. The overhead for such additional accuracy, however, was the necessity of transmitting a larger number of bits since the error detection/correction bits had to be transmitted along with the data bits. Prior memory systems have been developed wherein the data word to be stored in an addressable memory location is encoded to provide Error Correction Code (ECC) signals. These signals are stored in the system's memory along with the bits of the data word.

Upon readout, the data bits read from an addressable memory location are again subjected to the generation of the same error correction code signal pattern, and the newly generated pattern is compared to the error correction code signals stored in the memory. If a difference is detected, it is determined that the data word is in error. Depending upon the encoding system utilized, it is possible to identify and correct one or more bit positions in the data word which were identified as being in error. The system overhead for the utilization of error correction code signals is the time necessary to generate them, the memory cells necessary to store them, and the time required to decode them at readout. These are the offsetting disadvantages to the advantages of recording and reading back data with a higher degree of accuracy and integrity than systems without such an error correction code system.

Even with the addition of the circuitry necessary to generate the error correction code signals and the additional memory cells necessary to store them, errors can occur in the generation of the error correction code signals through circuit faults, through the erroneous recording or read back of the error correction code signals, through memory cell failure, or through read/write circuit failure. Such failures can lead to the indication of erroneous data with the possibility of correct data bits being altered in the correction system, when, in fact, the error actually occurred in the error correction code signal handling. Systems have also been developed that utilize redundant circuits which perform various integrity checking functions at the expense of additional cost of hardware, together with an increased error-inducing probability due to circuit malfunction of the integrity checking circuit itself.

U.S. Pat. No. 4,531,213, "Memory Through Checking System with Comparison of Data Word Parity Before and After ECC Processing" issued Jul. 13, 1985 in the name of James H. Scheuneman, and is assigned to the assignee of the present invention. The invention of this patent is an improved memory system for use in a data processing system, wherein the memory is arranged for storing data words and error correction code signals associated therewith at addressable location. Through checking circuitry is employed for checking the operation of the error correction code circuitry. A parity generator is included in the system of the prior Scheuneman patent for generating the parity of a data word. The parity generator has circuitry for storing the parity bits in the memory that were generated with the associated data word along with the related error correction code signals.

When a data word is accessed, circuitry is provided for generating new error correction code signals and comparing the newly generated signals with the error correction code signals read from the memory device. The comparison circuitry of the prior Scheuneman patent includes error correction circuitry that functions to correct a predetermined number of detected errors within the data read from the memory device. Parity generating circuitry for generating a parity signal for the data word read out after correction, if correction is indicated, is provided.

This prior system has the capability of comparing the parity generated at readout with the parity stored along with the accessed data word for determining whether a data bit has been erroneously corrected due to a malfunction of the error correction code circuitry. The comparison circuitry provides an error indicating signal when the parity that is calculated at read out has a predetermined relationship to the parity signal stored with the accessed word.

A major problem in the use of Error Correcting Codes (ECC) is the testability of the ECC and supporting circuitry. The ECC may be effectively tested using special purpose test equipment, but this approach is usually too costly for other than the in-factory testing. A common method of field testing utilizes test software which reads and writes test patterns into the memory array and thereby inferentially tests the ECC. This technique is widely used despite the time consuming nature of the software testing. The greatest disadvantage of this technique is the necessary reliance upon assuming correct operation of the memory array. This assumption may be so unrealistic (i.e., probability of memory array failure may be so high) as to render the testing technique unacceptably unreliable.

The invention of U.S. Pat. No. 4,223,382, issued in the name of Lee T. Thorsrud and assigned to the assignee of the present invention, permits the cost advantages of software testing of ECC without reliance upon the use of the memory array in the testing process. The memory module of this patent has a semiconductor memory array and contains Error Correction Circuitry (ECC). The memory module also contains a status register which is used for control of various member functions and for indicating certain status information (e.g., error status, error logging, etc.). The status register may be accessed (i.e., written into and read from) as if it were an addressable location of the memory module whenever the memory module is placed into maintenance mode. A two position manual switch selects normal or maintenance mode. In maintenance mode one or more addresses are dedicated to accessing the status register. Therefore, the contents of the status register may be altered by placing the memory module into maintenance mode and writing via software into a dedicated address.

BRIEF DESCRIPTION OF THE DRAWING

The present invention is illustrated by reference to the drawing in which:

The FIGURE shows a block diagram of the present invention for achieving error correction check of a CMOS memory during write cycles.

SUMMARY OF THE INVENTION

Error detection and correction is achieved in a data processing system during a memory write cycle by a technique which bypasses the memory so that if any errors are detected by the error detection and correction circuitry they are known to have occurred in the memory system in areas other than the memory itself. This allows for checking of the memory driving and reading logic, including the check bit generator, logic translators and the syndrome generator. These components are assumed to be functioning properly in most error detection and correction schemes, and any errors that occur are presumed to be in the memory.

DESCRIPTION OF THE PREFERRED EMBODIMENT

The present invention is utilizable with other error correction techniques, such as that shown in U.S. Pat. No. 4,531,213, and provides, in conjunction with these other types of error checking schemes, the additional advantage of being able to detect errors in elements of the system which are independent of the memory itself. The invention requires very little additional circuitry over that already present in the error correcting systems commonly employed for comparing the error correction code generated from read out bits with the error correction code that was previously stored in memory.

Referring to the FIGURE, there is shown a portion of data processing system 10 which incorporates error correction and a memory 20, which, in the preferred embodiment, is a high speed Dynamic Random Access Memory (DRAM). A Write Data Register 12 receives the data to be written into the memory under the control of address information fed into the Address Register 14. In order to utilize fully the capabilities of the DRAM, high speed Emitter-Coupled Logic (ECL) translators for translating the logic signals in ECL logic to Transistor-Transistor Logic (TTL) are desirable for both read and write operations. The data in the Write Data Register 12 is, therefore, coupled on the Bus 11 to the Translators 16.

The Write Data Register is also coupled to the Check Bit Generator 18 on the Bus 15, as is the address information in the Address Register 14 on the Bus 9. The Address Register 14 also supplies addresses to the address access lines of the Memory 20 on the Bus 19 and to the Syndrome Generator 22 on the Bus 23. The outputs of the Translators 16 are coupled on the Bus 17 to the Memory 20. The check bits developed in the Check Bit Generator 18 are also supplied on the Bus 21 to the Translators 16. The outputs of the Translators 16 are supplied on the Bus 17 to the Memory 20 where both the write data and the check bits are stored. In the preferred embodiment of this invention, a known conventional type of Dynamic Random Access Memory (DRAM) 20 is utilized which has lines (represented by the dotted lines 31) that are directly coupled between the input Bus 17 and the output Bus 29. Examples of commercially available suitable RAMS are the Mitsubishi M5M44256, the MICRM MT4C4256 and the Fujitsui MB81C4256 RAMS.

In prior memory and error correcting systems, the syndrome generator was operable only during read cycles, and not during write cycles. In a typical prior system, the output from the Memory 20 during the read cycle would have been coupled on the Bus 38 from the TTL to ECL Translators 34 to an Error Correction Circuit 40, and also on the Bus 42 to a Syndrome Generator 22. The bits received on the line 38 would be retained in the Error Correction Circuit 40 until the Syndrome Generator 22 utilized both the read data on the Bus 42 and the address information on the Bus 23. An appropriate syndrome code would then be generated and supplied on the Bus 43 to the Decoder 44. The Decoder 44 would then translate the code which would be supplied on the Bus 46 to the Error Correction Circuit 40, where the appropriate error correction would be performed. In general, commonly employed ECC techniques utilize two bit error detection and single bit error correction. More complete error correction may be utilized if the designer is willing to provide sufficient overhead circuitry and timing features.

Upon correction by the Error Correcting Circuit 40, the corrected read data is supplied on the Bus 54 to the Parity Checker 48 to ensure that the parity of the output data is correct. The Decoder 44, in addition to supplying the error correcting code on the Bus 46, also supplies information on the Bus 53 to a Bank Status Register 52, which can indicate on the Bus 56 if an error has occurred, and the type of error and whether or not it is a correctable one.

During a read cycle the error that is detected may result from any one of the following portions of the circuitry: the Check Bit Generator 18, the emitter coupled logic to TTL Translators 16, the DRAM 20, the TTL to ECL Translators 34 or the Syndrome Generator 22. However, since generally the DRAM has a much higher failure rate than the logic circuit, the syndrome message is interpreted as a DRAM error even though the failure could be in the logic.

As previously noted, during the write cycle, the write data that is present on the input to the memory unit passes through on the lines 31 to the output. The present invention utilizes this information that is present on the input and concurrently on the output of the DRAM, via Bus 29, by activating the syndrome generator during the write cycle. Thus, if a syndrome message is generated during the write cycle, this message is stored in the Bank Status Register 52, and the Control Unit 26 sets a write bit by a signal on the line 51, which indicates that the error occurred during the write cycle instead of the read cycle. It is obvious, therefore, that such an error must have occurred in the logic other than the memory unit. On the other hand, if during a write cycle, a syndrome message is not generated, but a parity check error is indicated by the Parity Check Circuit 48, then the error is isolated as occurring in the Decoder 44, the Error Correction Circuit 40 or the Parity Checker 48.

We claim:

1. In a memory system comprising memory means for storing digital bits, input means coupled to said memory means for supplying bits to said memory means, output means coupled to said memory means for receiving bits from said memory means, write means for writing selected bits from said input means into said memory means during a write cycle, read means for reading selected bits out of said memory means to said output means during a read cycle, error checking and correction means coupled to said output means for checking and correcting errors upon the occurrence of said selected bits at said output means, control means coupled to said memory means to control the writing of selected bits into said memory means and the reading of selected bits from said memory means, syndrome generating means coupled to said output means for developing a syndrome code representative of said selected bits of said output means, and coupling means for coupling selected bits to be written into said memory means during write cycles to said error checking and correction means in a manner that bypasses said selected bits from said memory means, the improvement wherein said syndrome generating means is operable during during both read and write cycles, and said memory system further comprises status means coupled to said control means and to said syndrome generating means for indicating when an error is detected if said error occurred during a read cycle or during a write cycle, and for isolating errors which are generated in said memory means from errors which are generated in other elements of said memory system.

2. In a memory system as claimed in claim 1, the further improvement wherein said error checking and correction means comprises parity checking means that are isolated from said status means for more precisely determining the origin of errors in said memory system.

* * * * *